Oct. 17, 1961                J. A. GAIT              3,004,433
                      AUTOMATIC SETTING BAROMETER
Filed Oct. 24, 1957                              2 Sheets-Sheet 1
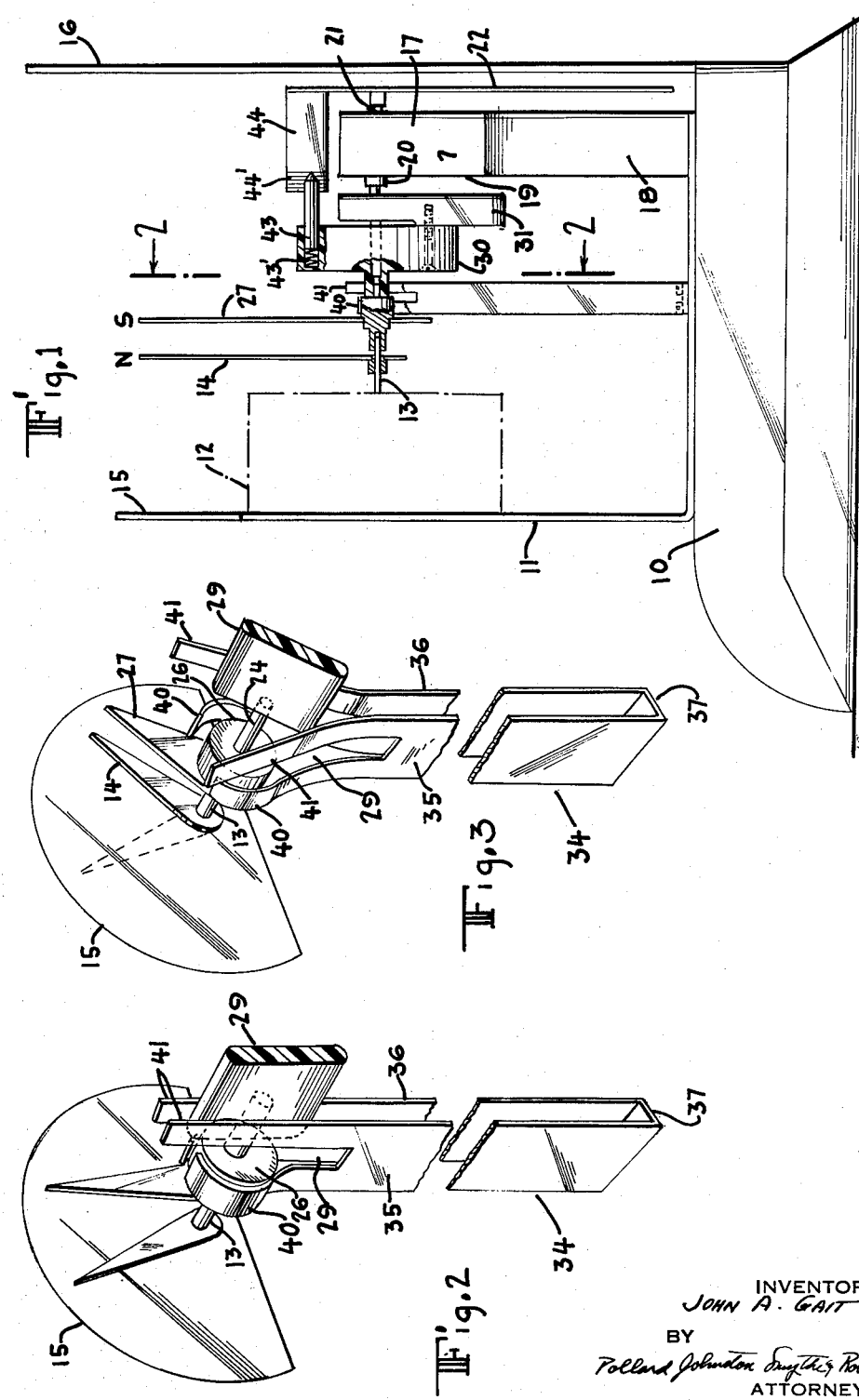
INVENTOR
JOHN A. GAIT
BY
Pollard Johnston Smythe & Robertson
ATTORNEY Oct. 17, 1961                J. A. GAIT                3,004,433
                     AUTOMATIC SETTING BAROMETER
Filed Oct. 24, 1957                              2 Sheets-Sheet 2

INVENTOR
JOHN A. GAIT
BY
Pollard Johnston Smythes Robertson
ATTORNEYS

United States Patent Office 3,004,433
Patented Oct. 17, 1961

3,004,433
AUTOMATIC SETTING BAROMETER
John A. Gait, Larchmont, N.Y., assignor, by direct and mesne assignments, of one-half to Pam Clock Co., Inc., New Rochelle, N.Y., a corporation of New York, and one-half to John A. Gait, Wheaton, Ill.
Filed Oct. 24, 1957, Ser. No. 692,229
10 Claims. (Cl. 73—387)

The present invention relates to barometers, and particularly to a new and improved apparatus for automatically setting a reference hand of a barometer into alignment with the barometer indicating hand at predetermined time intervals.

Normally, it is desired to know the relative rise or fall of a barometer within a predetermined period. Reference hands of barometers are generally manually set into alignment with the barometer indicating hand. There may be a substantial time delay between setting and subsequent reading of the relative change of the indicating hand, so that unless it is remembered when the reference hand was last set into alignment therewith, the time of setting may have been forgotten.

The principal object of this invention is to provide a barometer having a reference hand that is automatically moved into alignment with the barometer indicating hand at predetermined time intervals.

Another object of the invention is to combine a horological instrument with a barometer so that at predetermined time intervals, means may be activated to cause movement of the barometer reference hand into alignment with the barometer indicating hand.

Another object of this invention is to combine a horological instrument with a barometer, in the latter of which a magnetic field is provided between the barometer indicating hand and its reference hand so that the reference hand moves into alignment with the indicating hand when the reference hand is unrestrained.

Another object of the invention is to provide such a combined horological instrument and barometer in which the reference hand of the barometer is normally restrained against movement, but at the end of a predetermined time interval, the horological instrument releases the restraining means for a sufficient time interval to enable the magnetized barometer indicating and reference hands to move into alignment with each other prior to the horological instrument causing the restraining means to become effective again.

In one aspect of the invention, a barometer of any desired type having an indicating and a reference hand may be employed, the reference hand of which may be mounted on substantially frictionless pivots, such, for example, as jewel pivots, so that it is free to rotate about its pivots with a minimum of required effort.

In one form, each of the barometer hands may be magnetized with a north pole at the arrowhead or pointer end of one hand and a south pole at the arrowhead or pointer end of the other.

In a further aspect of the invention, a releasable brake may be provided for restraining the pivotal movement of the reference hand of the barometer, and brake releasing means may be provided, the effectiveness of which may be controlled by a horological instrument such as a clock. The clock may be electrically operated, from any source including batteries and/or a transistorized circuit, or may be spring operated. The horological instrument may include a time responsive tripping means that may act on, and render effective the brake releasing means at predetermined intervals, and for a time element within which the magnetized barometer hands cause the movement of the reference hand into alignment with the barometer indicating hand, after which the horological instrument may render effective the brake means.

The above and other objects, features and advantages of the invention will become apparent from the following specification and accompanying drawings, which are merely exemplary.

In the drawings:

FIG. 1 is a side elevational view of a combined barometer and horological instrument to which the principles of the invention have been applied;

FIG. 2 is a perspective view, partly in section, of a portion of the brake applying and releasing means, and taken substantially along line 2—2 of FIG. 1 showing the apparatus in brake applying condition;

FIG. 3 is a view similar to FIG. 2 with the apparatus in brake releasing condition;

Figure 4:
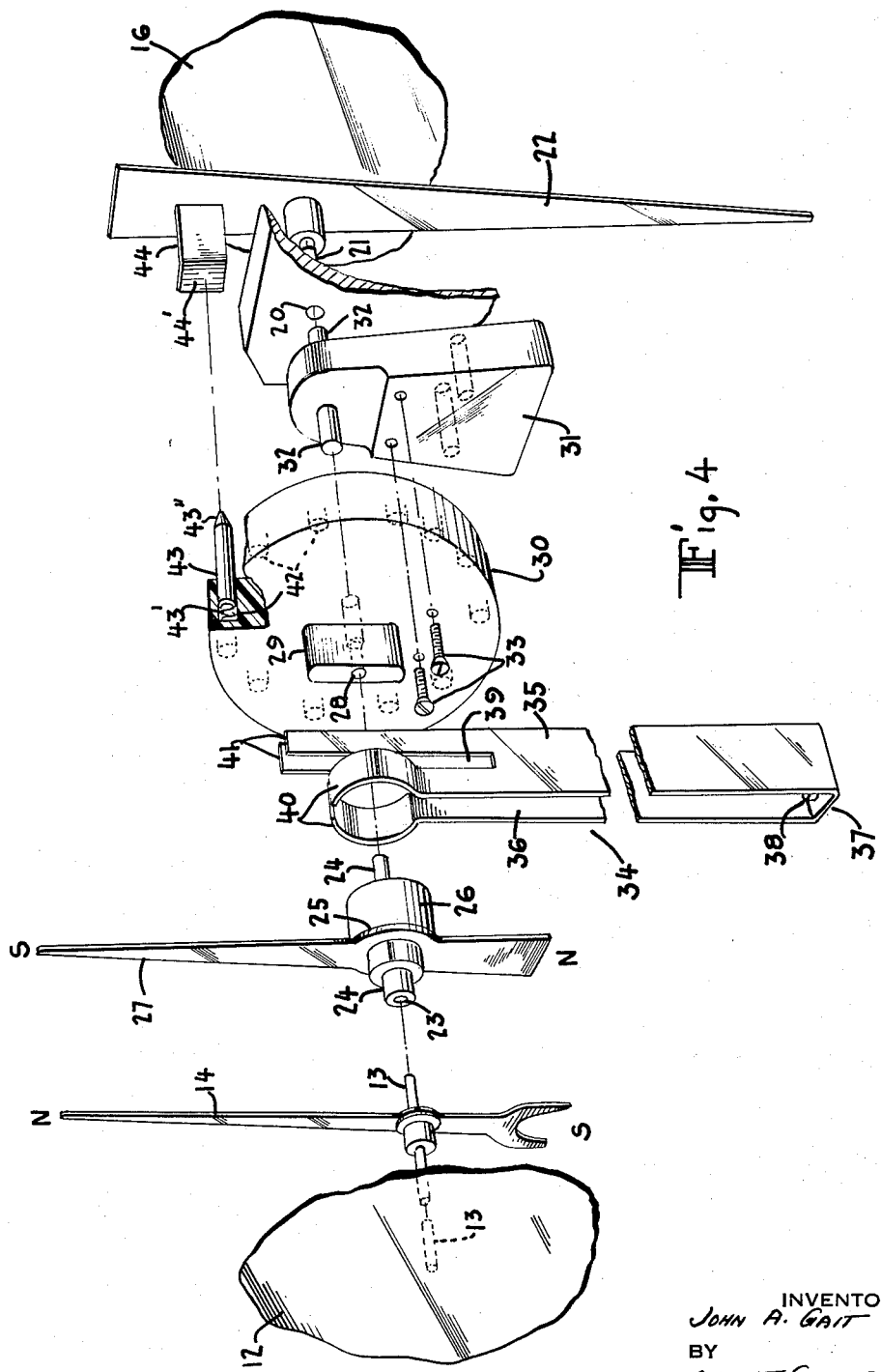
FIG. 4 is an exploded view of the principal elements of the apparatus of FIG. 1.

Referring to the drawings, and particularly to FIG. 1, the principles of the invention are shown as applied to a combined barometer and clock comprising a base 10 to which is fixed a right-angularly constructed supporting bracket 11.

A barometer 12 may be attached to the vertical wall of the bracket 11 and it may be of the aneroid type, or any other type having an oscillatable spindle 13 that may support an indicating hand 14. The hand 14 may be magnetized in a manner so that its arrow pointer end is a north pole and its opposite end a south pole for a purpose to be described later. One hand only may be magnetized and the other made of soft iron or other material serving as an armature. A dial 15 may be fixed to the vertical wall of bracket 11 and may include the indicia representing barometric pressure.

A transparent or suitable clock face 16 may be mounted on the base 10 in line with the bracket 11. A clockworks or clock mechanism, generally indicated at 17, may be supported by a standard 18 that in turn is supported by the horizontal portion of bracket 11. The type of clockworks is not material; however, the back face 19 of its housing may be provided with a bearing 20 axially aligned with the spindle 21 on which an hour hand 22 is mounted.

Referring to FIG. 4, the spindle 13 of the barometer fixedly supports the indicating hand 14 and extends into a bore 23 of a shaft 24. The shaft 24 may be provided with a shoulder 25 forming a cylindrical brake surface 26. A reference hand 27 may be fixed to shaft 24 against the shoulder 25. The reference hand 27 may be magnetized so that its arrow pointer end is a south pole and its opposite end a north pole for a purpose to be described later. The end of shaft 24 opposite that containing the bore 23 may form another bearing with a bore 28 within a cam 29. The bearing formed by the righthand end of shaft 13 and bore 23, as well as the bearing between the righthand end of shaft 24 and bore 28 preferably are substantially frictionless to provide a minimum of resistance to the turning of reference hand 27.

The cam 29 is fixed to a cam wheel 30, and the bore 28 extends axially through both the cam 29 and the cam wheel 30. A counterweight 31 may be provided with a pin 32 extending through and outwardly beyond each side thereof. The lefthand end of pin 32 may pass into the righthand end of bore 28, and screws 33 may extend through cam wheel 30 into counterweight 31 to thereby lock the counterweight 31 and cam wheel 30 together.

The righthand end of pin 32 may extend into the bearing 20 formed in the rear face 19 of the clock housing 17. From the foregoing it is evident that the shaft 23, cam wheel 30 with its counterweight 31 are supported between shaft 13 and bearing 20 in aligned relation.

A resilient braking device 34 may include parallelly disposed resilient arms 35, 36 that may be integrally joined at one end by a member 37 which may be rigidly attached to the horizontal portion of bracket 11 by screws 38.

The arms 35, 36 may be slotted at 39, forming two pairs 40 and 41 of resilient elements. The pair 40 may be formed cylindrically to conform to the cylindrical brake surface 26 of shaft 24, and designed to normally apply a braking action thereto. The pair of elements 41 may receive between them the cam 29 that normally is maintained vertically and ineffective by the counterweight 31 acting on the cam wheel 30. The cam wheel 30 may be provided with a circularly disposed series of holes 42 near its outer periphery. Certain of these holes may extend through the counterweight 31. In the embodiment disclosed, twelve equally spaced holes 42 are provided, although more or less may be provided if desired. One or more pins 43 may be located in the holes at desired intervals about the periphery of the cam wheel 30. The pin or pins 43 preferably are backed up by a spring 43' within the holes 42, and the outer end of each pin 43 may be provided with a cam surface 43". The pin or pins 43 may be long enough to extend through the counterweight 31 and into the circular path of movement of an actuator 44 having a mating cam surface 44' and fixed to the hour hand 22 of the clock mechanism 17. As the hour hand 22 periodically contacts a pin 43, cam wheel 30 and cam 29 are turned angularly about the axis between shaft 13 and bearing 20, thereby causing cam 29 to separate the pair of elements 41 which accordingly separate the pair of braking elements 40. Each time this occurs, the north pole of the indicator hand 14 will attract the south pole of the reference hand 27. Since the indicator hand is fixed against angular turning relatively to the reference hand 27 by being connected to the barometer works, and the reference hand 27 is mounted on substantially frictionless bearings, it is evident that the reference hand 27 will angularly turn about its pivot bearings to a position where it will be aligned with the indicator hand 14.

The design of the cam surfaces 43", 44' and the springs 43', as well as the weight of the counterweight 31 and the resiliency of the arms 35, 36 are such that when the pair of brake elements 40 has been moved out of engagement with brake surface 26, continued angular movement of hour hand 22 and actuator 44 forces the pin 43 in contact with it leftwardly into its corresponding hole 42. The actuator 44 may then pass beyond or release the pin 43, whereupon the counterweight returns the cam 29 to its normal vertical position. This permits the pair of elements 40 to engage the brake surface 26 to thereby retain the reference hand 27 in fixed position relatively to the indicator hand 14 until the actuator 44 again engages a pin 43, at which time the preceding operations are repeated.

From the foregoing it is evident that a unique combination of a barometer and horological instrument provides an automatically resettable reference hand of the barometer so that at any given time of the day the barometer will indicate the change of barometric pressure relatively to a known time of that day.

Although the various features of the improved combined barometer and horological apparatus have been shown and described in detail to fully disclose one embodiment of the invention, it will be evident that numerous changes may be made in such details, and certain features may be used without others without departing from the principles of the invention.

What is claimed is:

1. In a combined barometer and horological apparatus, an indicator hand connected to, and angularly actuated about an axis by the barometer; a reference hand mounted for free angular turning on an axis coextensive with the axis of said indicator hand; magnetic means for moving said hands into alignment; means normally restraining the turning of said reference hand; and means operable by said horological apparatus for periodically overcoming said restraining means.

2. In a combined barometer and horological apparatus, an indicator hand connected to, and angularly moved about an axis by the barometer, said indicator hand being adapted to be magnetized so that its pointer end is at one pole and its opposite end is at the other pole; a reference hand mounted for free angular turning on an axis coextensive with the axis of said indicator hand, said reference hand being adapted to be magnetized so that its pointer end is the opposite pole from that of the pointer end of said indicating hand; means normally restraining the turning of said reference hand; and means operable by said horological apparatus for periodically overcoming said restraining means.

3. In a combined barometer and horological apparatus, an indicator hand connected to, and angularly actuated about an axis by the barometer; a reference hand mounted for free angular turning on an axis coextensive with the axis of said indicator hand; energy means normally urging said hands into alignment; a brake surface fixed to said reference hand; resilient brake means normally engaging said brake surface; and means operated by said horological apparatus periodically to render said brake means ineffective to thereby release said reference hand.

4. In a combined barometer and horological apparatus, an indicator hand connected to, and angularly actuated about an axis by the barometer; a reference hand mounted for free angular turning on an axis coextensive with the axis of said indicator hand; magnetic means normally urging said hands into alignment; a brake surface fixed to said reference hand; resilient brake means normally engaging said brake surface; and means operated by said horological apparatus periodically to render said brake means ineffective to thereby release said reference hand.

5. In a combined barometer and horological apparatus, an indicator hand connected to, and angularly moved about an axis by the barometer, said indicator hand being magnetized and having its pointer end as one pole and its opposite end as the other pole; a reference hand mounted for free angular turning on an axis coextensive with the axis of said indicator hand, said reference hand being magnetized so that its pointer end is the opposite pole from that of the pointer end of said indicating hand; a brake surface fixed to said reference hand; non-rotatable, resilient brake means normally engaging said brake surface; and means operated by said horological apparatus periodically to render said brake means ineffective to thereby release said reference hand.

6. In a combined barometer and horological apparatus having an hour measuring means, an indicator hand connected to, and angularly moved about an axis by the barometer, said indicator hand being magnetized and having its pointer end as one pole and its opposite end as the other pole; a reference hand mounted for free angular turning on an axis coextensive with the axis of said indicator hand, said reference hand being magnetized so that its pointer end is the opposite pole from that of the pointer end of said indicating hand; a brake surface fixed to said reference hand; resilient brake means normally engaging said brake surface; normally ineffective cam means adapted to cooperate with said brake means to render said brake means ineffective; means fixed to said cam means adapted periodically to cooperate with the hour measuring means of said horological apparatus to cause said cam means to render ineffective said brake means; and means on said cam means determining the time of effectiveness of said cam means.

7. In a combined barometer and horological apparatus, a base; a transparent face mounted at one end of said base and cooperable with said horological apparatus to indicate time; a barometer mounted on said base having a spindle axis in alignment with the hour measuring spindle of said horological apparatus; a dial for said barometer viewable through said transparent face; indicating and reference hands mounted on the spindle axis of said barometer; magnetized field means acting between said hands to normally urge said hands into alignment; restraining means holding said reference hand in fixed position; and means periodically operated by said horological apparatus for rendering ineffective said restraining means.

8. In a combined barometer and horological apparatus, a base; a transparent face mounted at one end of said base and cooperable with said horological apparatus to indicate time; a barometer mounted on said base having a spindle axis in alignment with the hour measuring spindle of said horological apparatus; a dial for said barometer viewable through said transparent face; indicating and reference hands mounted on the spindle axis of said barometer; energy means normally urging said hands into alignment; restraining means holding said reference hand in fixed position; and means periodically operated by said horological apparatus for rendering ineffective said restraining means.

9. In a combined barometer and horological apparatus, a base; a transparent face mounted at one end of said base and cooperable with said horological apparatus to indicate time; a barometer mounted on said base having a spindle axis in alignment with the hour measuring spindle of said horological apparatus; a dial for said barometer viewable through said transparent face; indicating and reference hands mounted on the spindle axis of said barometer; magnetic means normally urging said hands into alignment; restraining means holding said reference hand in fixed position; and means periodically operated by said horological apparatus for rendering ineffective said restraining means.

10. In a combined barometer and horological apparatus, a base; a transparent face mounted at one end of said base and cooperable with said horological apparatus to indicate time; a barometer mounted on said base having a spindle axis in alignment with the hour measuring spindle of said horological apparatus; a dial for said barometer viewable through said transparent face; indicating and reference hands mounted on the spindle axis of said barometer, said hands being magnetized so that their pointer ends are of opposite polarity; restraining means holding said reference hand in fixed position; and means periodically operated by said horological apparatus for rendering ineffective said restraining means.

References Cited in the file of this patent

UNITED STATES PATENTS

| | | |
|---|---|---|
| 2,449,283 | Dike et al. | Sept. 14, 1948 |
| 2,475,573 | Smith et al. | July 5, 1949 |
| 2,510,402 | Johnston | June 6, 1950 |